United States Patent [19]
Lo

[11] Patent Number: 5,995,514
[45] Date of Patent: Nov. 30, 1999

[54] REVERSIBLE MEDIA INDEPENDENT INTERFACE

[75] Inventor: William Lo, Santa Clara, Calif.

[73] Assignee: Advanced Micro Devices, Inc., Sunnyvale, Calif.

[21] Appl. No.: 08/787,152

[22] Filed: Jan. 31, 1997

[51] Int. Cl.$^6$ ................................................. H04L 12/00
[52] U.S. Cl. .......................................... 370/463; 370/469
[58] Field of Search .................................. 370/492, 419, 370/420, 463, 465, 467, 469

[56] References Cited

U.S. PATENT DOCUMENTS

| | | | |
|---|---|---|---|
| 5,673,254 | 9/1997 | Crayford | 370/236 |
| 5,734,675 | 3/1998 | Leonowich | 370/274 |
| 5,784,559 | 7/1998 | Frazier | 370/236 |

OTHER PUBLICATIONS

The IEEE Standard Dictionary of Electrical and Electronics Terms—Sixth Edition IEEE STD 100–1996, ISBN 1–55937–833–6, Dec. 1996.

*Primary Examiner*—Chau Nguyen
*Assistant Examiner*—Frederic D. Wolkow
*Attorney, Agent, or Firm*—Sawyer & Associates

[57] ABSTRACT

A reversible media independent interface (MII) circuit is disclosed. The MII circuit comprises a first management circuit and a second management circuit. The first management circuit is operating in a first mode, the first mode being an interface between the MII and a media access control (AC) device. The second management circuit is operating in a second mode, the second mode being an interface between the MII and a physical layer (PHY) device. The MII circuit also includes a plurality of signals being provided to and sent from the MII circuit. A first portion of the plurality of signals are operable within either a physical layer device in a first mode or a media access control device in a second mode. A second portion of the plurality of the signals are provided the first management circuit and the second management circuit. The second portion of the plurality of signals are modifiable such that they are operable within the first management circuit in the first mode and are operable within the second management circuit in the second mode. In one embodiment by allowing the portion of the plurality of signals to be in a first and second mode (i.e., forward or reverse). The MII interface can be reversed such that it looks likes the MII interface found on either the PHY or MAC device. Accordingly, then either the MAC device can then be connected directly to the repeater without any PHYs or vice versa.

14 Claims, 7 Drawing Sheets

200

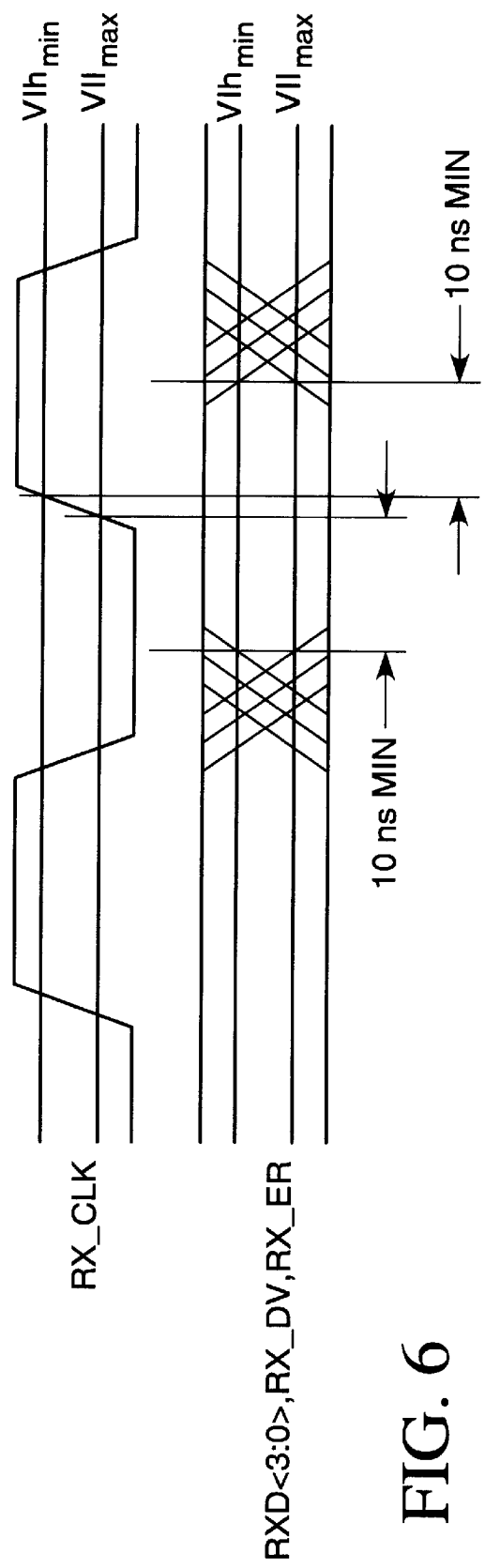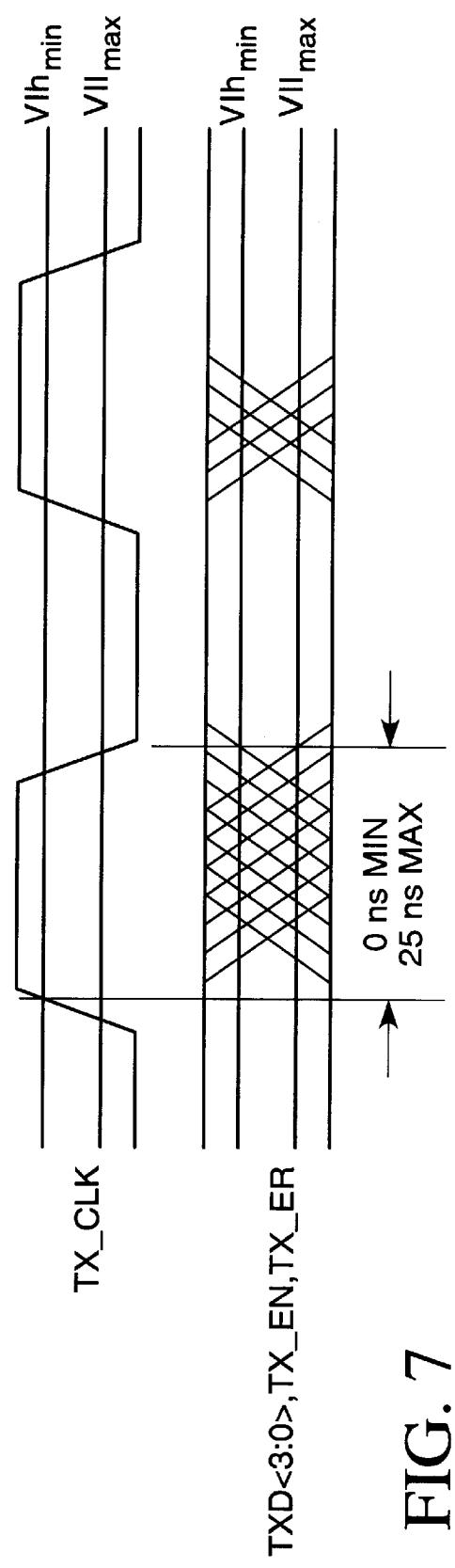

REVERSIBLE MEDIA INDEPENDENT INTERFACE

FIELD OF THE INVENTION

The present invention relates to devices utilized in a network and more particularly the present invention relates to interface units utilized within such devices in a network.

BACKGROUND OF THE INVENTION

In the IEEE 802.3u, standard section 22, the Media Independent Interface (MII) is a standard interface that connects Media Access Control (MAC) sublayer device to a physical (PHY) layer device. The MII allows the same MAC device to be connected onto different physical layers.

FIG. 1 shows a first embodiment of a conventional repeater system 10. Although not explicitly stated in the IEEE 802.3 standard, the MII is commonly used to connect repeater devices onto various different physical layer devices.

The repeater system 10 of FIG. 1 includes a repeater 12 which includes a repeater core 14 which is in turn coupled to a plurality of PHY devices 16. The PHY devices 16 in turn are coupled to an associated data terminal equipment (DTE) 18. Typically, each of the DTEs 18 include serially connected PHY and MAC devices 17 and 19, respectively.

In a typical configuration the repeater takes the place of the MAC in that the direction of the MII signals on the repeater is identical to that of the MAC. Note that the data terminal equipment (DTE) contains a PHY and a MAC device. The repeater and DTE are connected together via the physical medium via the appropriate PHY devices. In a preferred embodiment a single management unit on the repeater can serve as the management interface between the repeater 12 and all external PHY devices.

FIG. 2 is an embodiment of a managed repeater system. In the managed repeater system of FIG. 2 a MAC device 20 is usually required to reside with a repeater to allow a microprocessor 26 to extract statistics and to provide in-band management. The MAC device 20 is typically connected to one of the ports of the repeater. Two PHY devices 16 and 22 are necessary to provide the connection between the repeater core 14' and the MAC device 20.

One of the problems with the above-identified arrangements is that multiple PHYs are utilized even though they may not be necessary. These additional PHYs contribute to the overall cost of the system. It is possible to eliminate these PHYs by providing custom solutions. However, for systems which utilize standardized components this is not a viable alternative.

Therefore, what is desired is a system and method which minimize the number of PHYs required in a network environment, while not requiring a custom solution. The system and method should be compatible with existing systems and easily adaptable to such systems. In addition, the system should be cost effective and easily implemented utilizing existing manufacturing techniques. The present invention addresses such a need.

SUMMARY OF THE INVENTION

A reversible media independent interface (MII) circuit is disclosed. The MII circuit comprises a first management circuit and a second management circuit. The first management circuit is operating in a first mode, the first mode being an interface between the ME and a media access control (MAC) device. The second management circuit is operating in a second mode, the second mode being an interface between the MII and a physical layer (PHY) device. The MII circuit also includes a plurality of signals are being provided to and sent from the MII circuit. A first portion of the plurality of signals are operable within either a physical layer device in a first mode or a media access control device in a second mode. A second portion of the plurality of the signals are provided the first management circuit and the second management circuit. The second portion of the plurality of signals are modifiable such that they are operable within the first management circuit in the first mode and are operable within the second management circuit in the second mode.

In one embodiment by allowing the portion of the plurality of signals to be in a first and second mode (i.e., forward or reverse). The MII interface can be reversed such that it looks likes the MII interface found on either the PHY or MAC device. Accordingly, then either the MAC device can then be connected directly to the repeater without any PHYs or vice versa.

BRIEF DESCRIPTION OF THE DRAWINGS

FIG. 6 is a timing diagram showing the relationship between receiver signals.

FIG. 7 is a timing diagram showing the relationship between transmitter signals.

DESCRIPTION OF THE INVENTION

The present invention relates to devices utilized in a network and more particularly the present invention relates to interface units utilized within such devices in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 3:
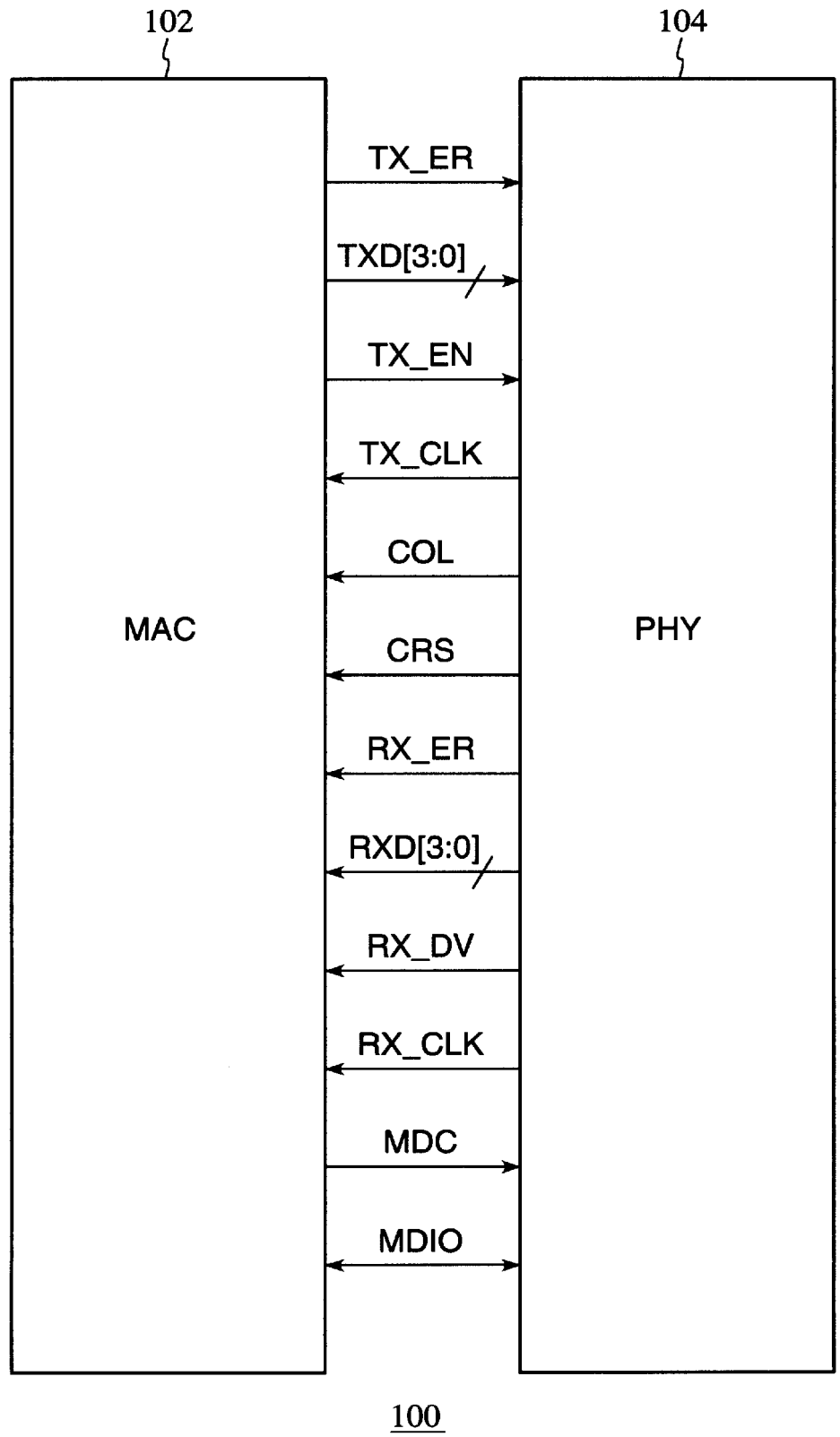
FIG. 3 shows a media independent interface (MII) connecting a MAC device and a PHY device.

FIG. 3 shows a media independent interface (MII) connecting a MAC device 102 and a PHY device 104. The MDC and MDIO signals are the signals for the serial management interface between the MAC device 102 and PHY device 104. The remaining signals are for normal packet transmit and receive. The MAC device 102 is the master of the management interface and the PHY device 104 is the slave device. The MAC device 102 can use this interface to control the PHY device 104 and to get status from the PHY device 104.

Figure 1:
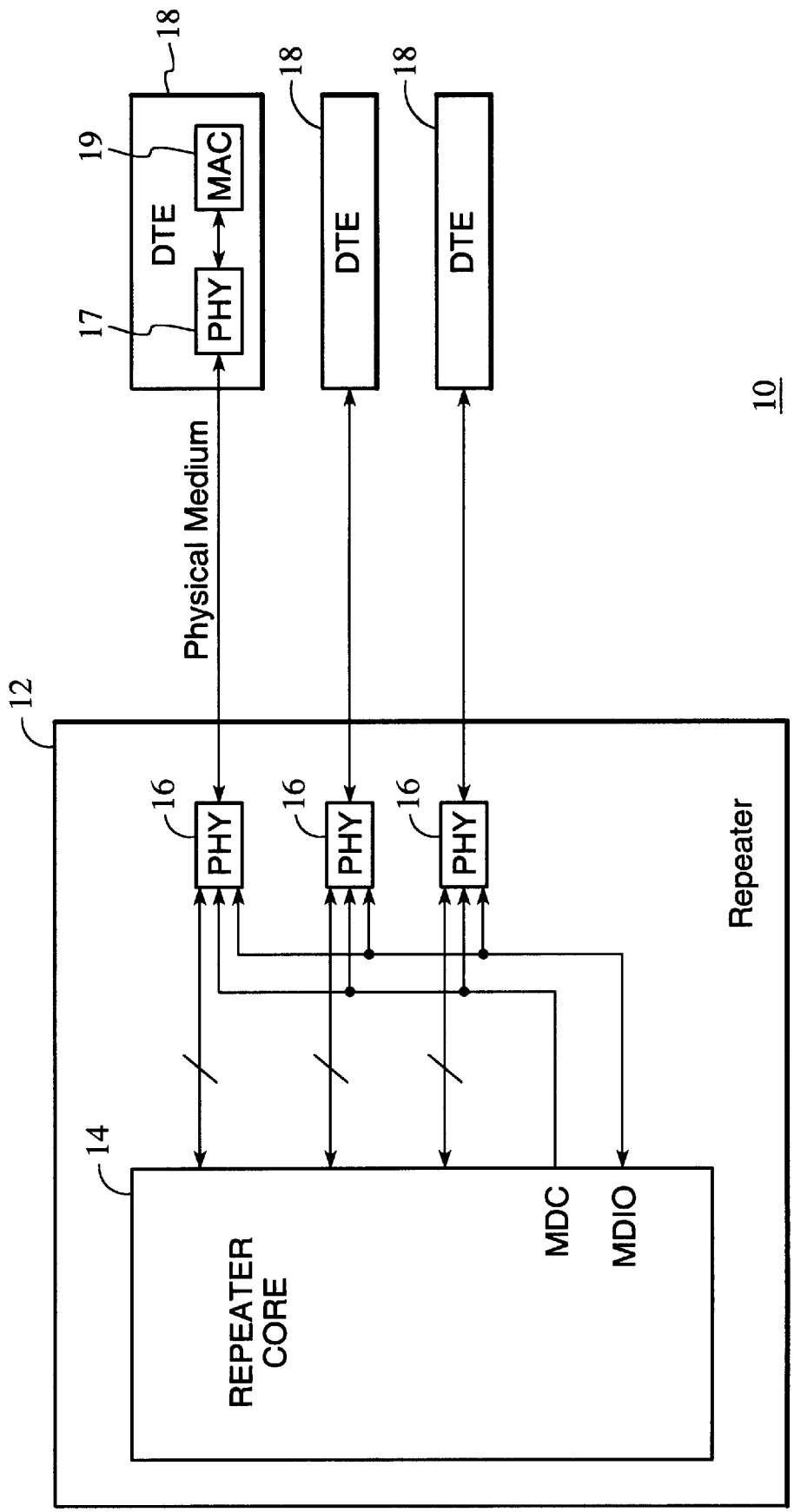
FIG. 1 shows a first embodiment of a conventional repeater system.
Figure 2:
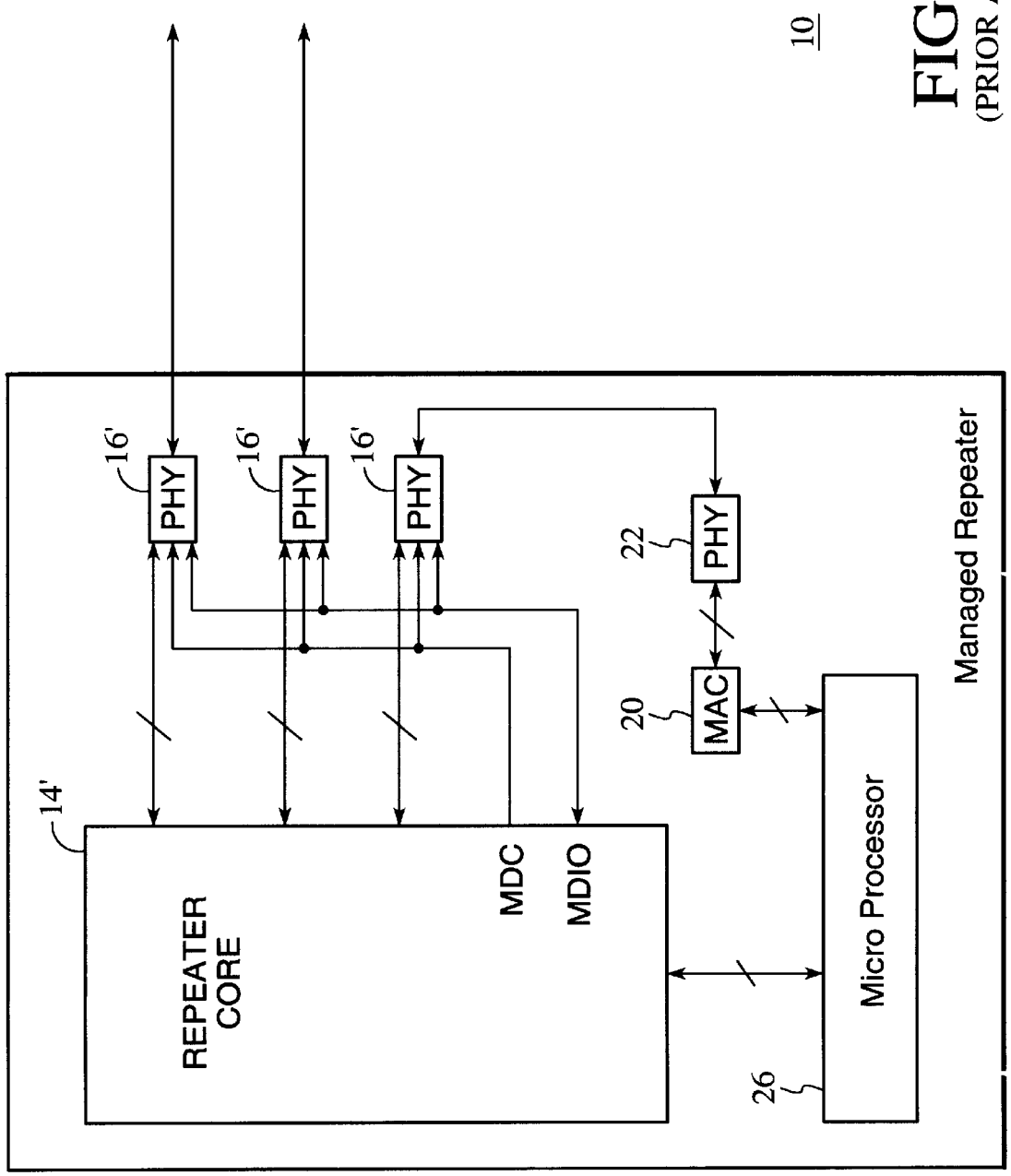
FIG. 2 is an embodiment of a managed repeater system.
Figure 4:
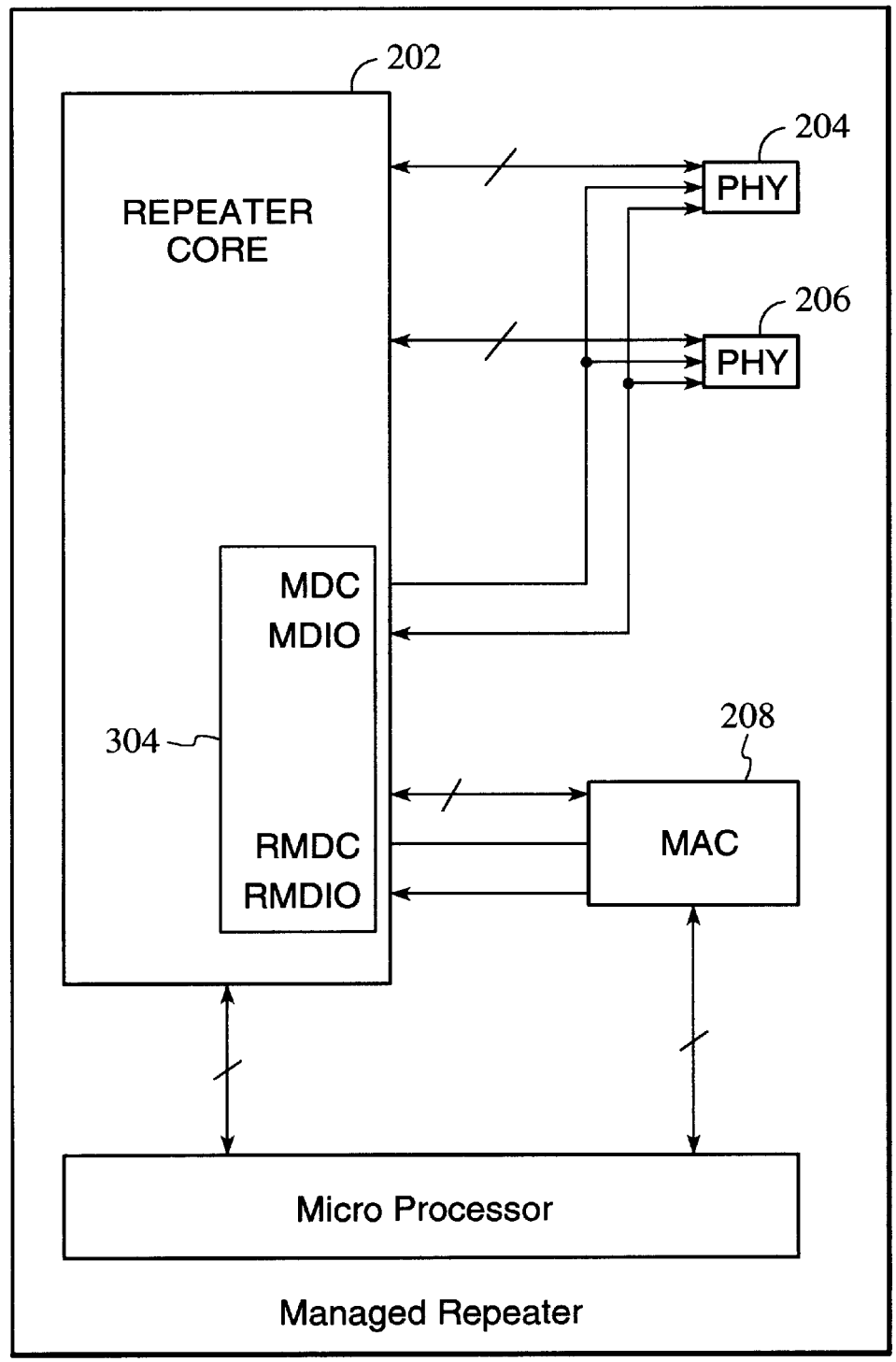
FIG. 4 is a block diagram of a managed repeater system in accordance with the present invention.

FIG. 4 is a block diagram of a managed repeater system 200 in accordance with the present invention. In this embodiment, repeater core 202 includes a reversible MII 300 which allows for the interface to both PHY and MAC devices 204, 206, 208 in a reversible manner. As is seen through this arrangement, the two PHY devices 16 and 22 of FIG. 2 are eliminated thereby reducing the overall cost of a repeater-based network particularly when several managed repeaters are utilized.

To avoid confusion, the MII on the MAC will be referred to as the MAC MII, and the MII on the PHY will be referred to as the PHY MII. So for example the TX_ER signal is an output of the MAC MII, and is an input of the PHY MII. In a preferred embodiment the MII on the repeater is the same as that of the MAC MII. This will be referred to as the normal mode. The MII on the repeater is said to be in the reverse mode when it operates in the same way as a PHY MII.

Accordingly Applicant has discovered that the MII circuitry found in MACs and PHYs can be modified such that the MII becomes reversible. The following discussion will be in the context of a MAC MII being reversible because it is typically within a repeater core, however, one of ordinary skill in the art will recognize that the PHY MII could be reversed and the use would be within the spirit and scope of the present invention.

The present invention comprises a reversible MMII circuit. The circuit includes a first management circuit and a second management circuit. The reversible MII circuit also includes a plurality of signals being provided to and sent from the MII circuit in which a portion of the plurality of the signals are provided the first management circuit and the second management circuit. The portion of the plurality of signals are modifiable such that they are utilized by the first management circuit in a first mode and are utilized by the second management circuit in a second mode.

In one embodiment by allowing the portion of the plurality of signals to be in a first and second mode (i.e., forward or reverse). The MII interface can be reversed such that it looks likes the MII interface found on either the PHY or MAC device. Accordingly, then either the MAC device can then be connected directly to the repeater without any PHYs or vice versa.

To more particularly describe the operation of the present invention in the context of a particular example, refer now to the following discussion in the context of the accompanying figures.

Figure 5A:
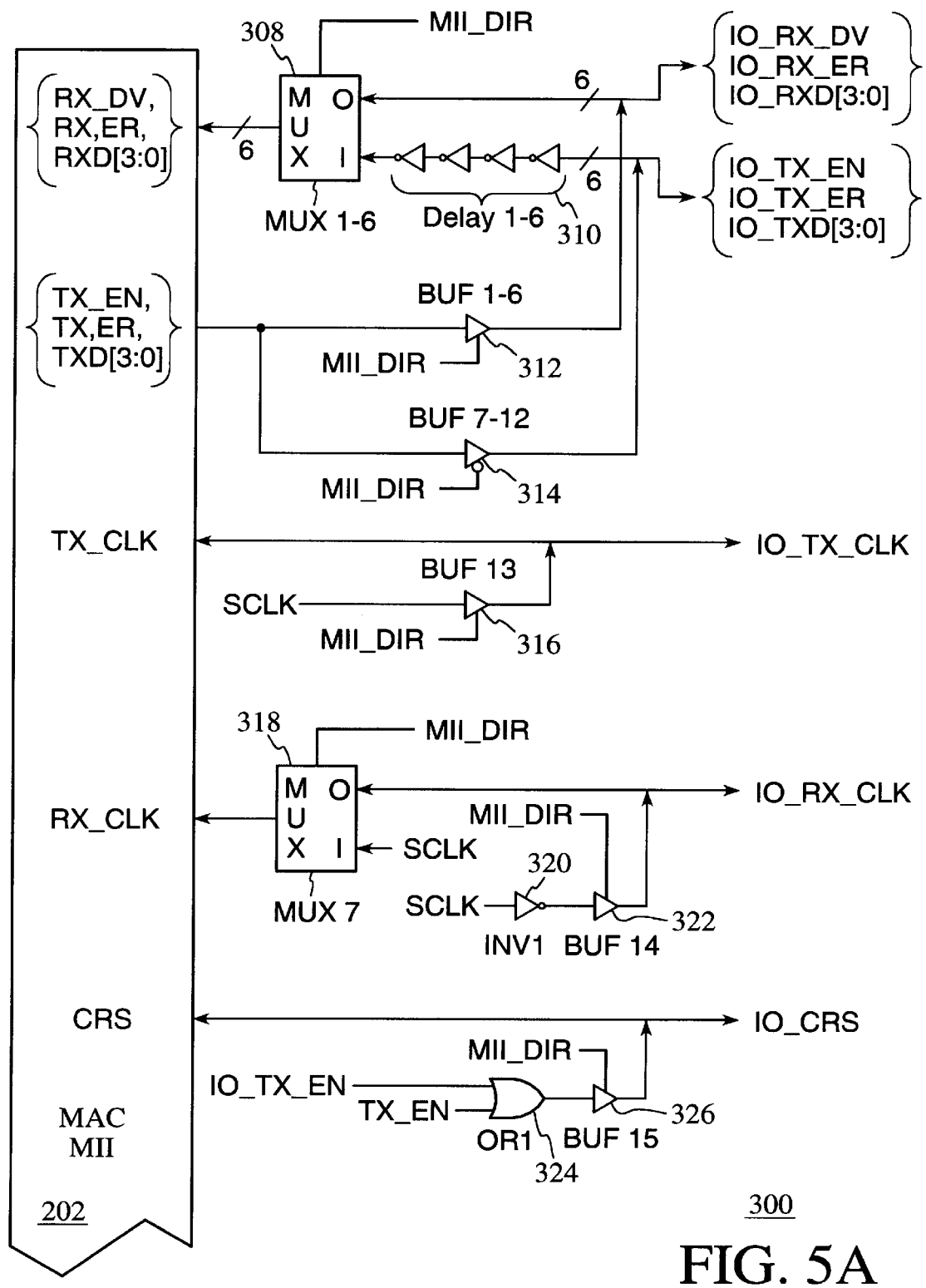
FIG. 5 illustrates a reversible MII found inside a repeater core modified such that it can operate as a MAC MII or a PHY MII.
Figure 5B:
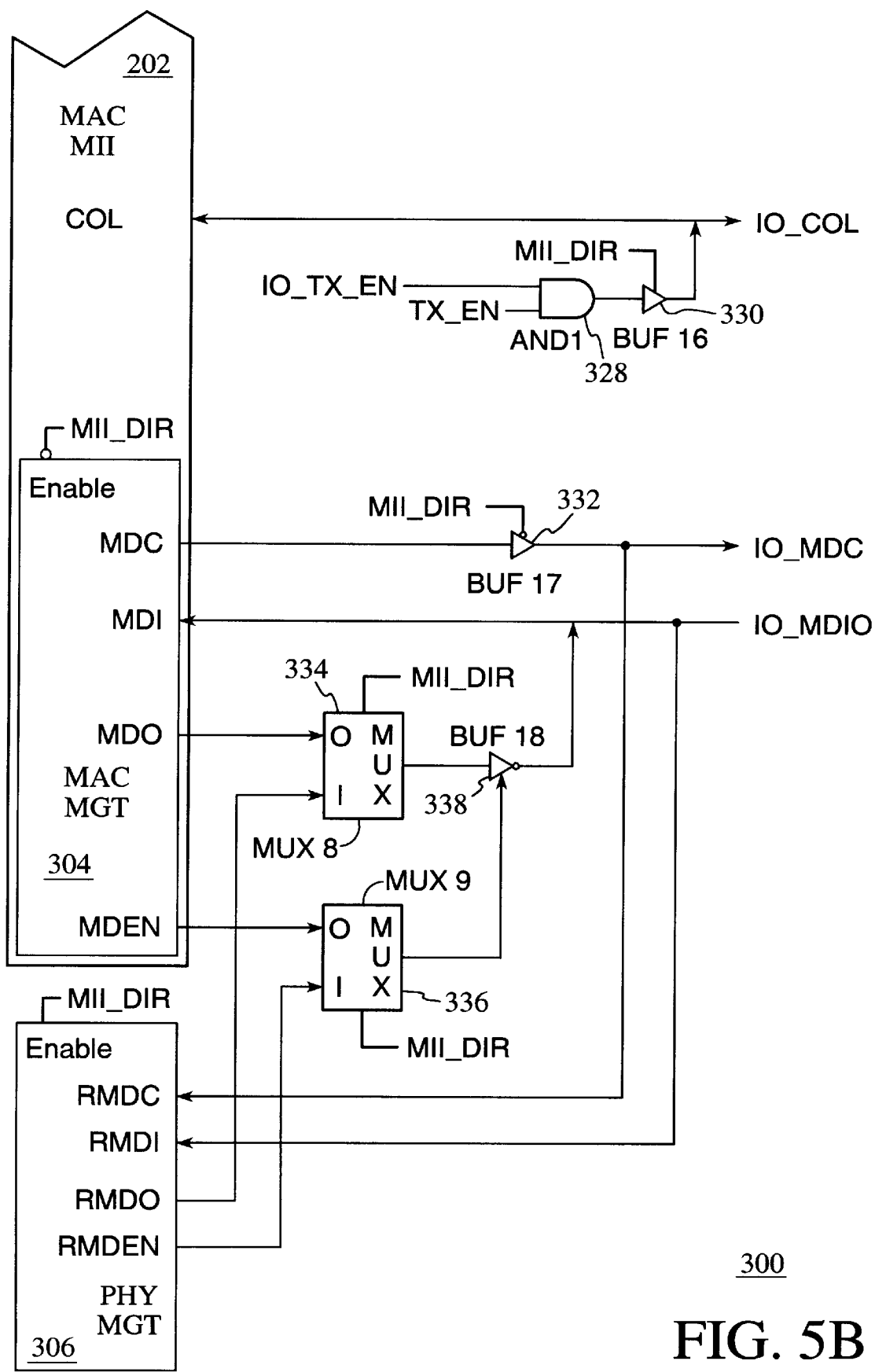

FIG. 5 illustrates a reversible MII 300 found inside a repeater core modified such that it can operate as a MAC MII or a PHY MII. As is seen, the reversible MII includes means for transmitting and receiving a variety of transmit, receive, control and management control signals. It also includes first and second management circuits 304 and 306. The first management circuit in this embodiment is the MAC management circuit 304 and the second management circuit is the PHY management circuit 306.

Signals prefixed with the prefix IO_ indicates the signals at the external interface of the repeater core. Signals that do not have the IO_ prefix indicates the MAC MII.

The PHY management circuit 306 is needed to support MII management while in the reverse mode. Only the MAC signals are prefixed with a R to distinguish the signals between the MAC management circuit and the PHY management circuit.

Two additional signals are introduced:

MII_DIR—indicates whether the MII is programmed in normal or reverse mode.

SYSCLK—a system clock—In a preferred embodiment, the system clock is a 25 MHz clock utilized in the reverse mode.

The operation of the modified MAC MII in the context of its various signals of FIG. 5 will now be described in detail. In FIG. 5 the polarity of the MII_DIR signal is: 0=normal mode, 1=reverse mode. RX_DV, RX_ER, and RXD[3:0] are a set of receiver signals that operate in a reversible manner. TX_EN, TX_ER, TXD[3:0], TX_CLK are the set of transmitter signals that operate in a reversible manner. COL and CRS are control signals relating to the MII that operate in a reversible manner.

MDC and MDIO are the management signals that control the MAC management circuit 304 and the PHY management circuit 306.

OPERATION OF REVERSIBLE MAC MII RECEIVER SIGNALS—RX_DV, RX_ER, RXD [3:0], RX_CLK

In the normal mode multiplexer 308 selects IO_RX_DV, IO_RX_ER, IO_RXD[3:0] and sends it into RX_DV, RX_ER, RXD[3:0] of the MAC MII. Buffer 322 is disabled and RX_CLK is clocked with IO_RX_CLK via multiplexer 318. Inside the multiplexer MAC MII 300, RX_DV, RX_ER, RXD[3:0] are sampled on the rising edge of RX_CLK. (See FIG. 6).

In the reverse mode multiplexer 308 selects a delayed version of IO_TX_EN, IO_TX_ER, IO_TXD[3:0] and sends it into RX_DV, RX_ER, RXD[3:0] of the MAC MII 300. Modified buffer 316 is enabled and IO_TX_CLK is driven by SCLK. RX_CLK is clocked with SCLK via multiplexer 318.

The delay 310 introduces a delay of 0 to 15 ns. The precise delay value depends on the actual setup and hold requirements of the reversible MAC MII 300. Because IO_TX_EN, IO_TX_ER, IO_TXD[3:0] are not guaranteed to be stable during the rising edge of IO_TX_CLK (FIG. 7). The delay 310 is necessary to keep RX_DV, RX_EN, RXD[3:0] stable on the rising edge of RX_CLK.

Note that in order for the delay to work, the internal setup and hold time requirement of RX_DV, RX_ER, RXD[3:0] to the rising edge of RX_CLK on the MAC MII must add up to a total of less than 15 ns. The standard allows a worst case of 20 ns. Since these signals are internal to the chip (unlike signals that go off chip) a sum of setup and hold equal to 15 ns can easily be met.

TRANSMITTER SIGNALS—TX_EN, TX_ER, TXD[3:0], TX_CLK

In the normal mode buffers 312 are disabled and buffers 314 are enabled. Hence TX_EN, TX_ER, TXD[3:0] are driven out on IO_RX_EN, IO_TX_ER, IO_TXD[3:0] respectively. Refer to FIG. 7 which illustrates a timing diagram of this relationship. Buffer 316 is disabled and TX_CLK is driven by IO_TX_CLK.

In the reverse mode buffers 314 are disabled and buffers 312 are enabled. Hence TX_EN, TX_ER, TXD[3:0] are driven out on IO_RX_DV, IO_RX_ER, IO_RXD[3:0] respectively. Buffer 316 is enabled and TX_CLK is driven by SCLK. Buffer 322 is enabled and IO_RX_CLK is driven by the inverted SCLK. The inversion is necessary to convert the timing relations output by the MAC MII (FIG. 7) into the output of a PHY (FIG. 6).

In order for the inversion to work the reversible MAC MII 300 must have the TX_CLK rising edge to TX_EN, TX_ER, TXD[3:0] transition of 10 ns or less, rather than 25 ns or less as specified in the standard. Since these signals are internal to the chip (unlike signals that go off chip) 10 ns delay can easily be met

CONTROL SIGNALS—CRS, COL

In the normal mode buffer 326 and buffer 330 are disabled and CRS and COL are driven by IO_CRS and IO_COL respectively.

In the reverse mode buffer 326 and buffer 330 are enabled and CRS is driven by the OR of IO_TX_EN and TX_EN, and COL is driven by the AND of IO_TX_EN and TX_EN. When TX_EN is asserted it means that the reversible MAC MII 300 is transmitting. When IO_TX_EN (which propagates to RX_DV) is asserted it means the reversible MAC MII 300 is receiving.

MANAGEMENT CONTROL SIGNALS—MDC, MDIO

In the case of MDIO, the signal internally is broken down into three signals:

MDI—input into the MII management circuit
MDO—output out of the MII management circuit
MDEN—output enable of the I/O buffer controlling MDIO Unlike the above signals, the MII management circuit cannot be shared in the normal and reverse mode without major modification. A simpler approach is to use two separate management circuits. In the normal mode, the MAC management circuit 304 is enabled, and the PHY management circuit 306 is disabled. In the reverse mode the opposite is true. By using two existing circuits only minor modifications are needed to bring the signals to the external pins. Note that in the reverse mode where the repeater core is attached to an external MAC device (FIG. 4), the PHY management circuit in the repeater core can be a stripped down version of the one found on a PHY, since in reality, there is no PHY to be managed.

In the normal mode buffer 332 is enabled and IO_MDC is driven by MDC. MDI is directly connected to IO_MDIO. MDO is output via multiplexer 334 and buffer 338 onto IO_MDIO. Buffer 338 enable is controlled by MDEN via multiplexer 336.

In the reverse mode, buffer 332 is disabled. IO_MDC drives RMDC. RMDI is directly connected to IO_MDIO. RMDO is output via multiplexer 334 and buffer 338 onto IO_MDIO. Buffer 338 enable is controlled by RMDEN via multiplexer 336.

Accordingly a reversible media independent interface MII is provided which substantially reduces the overall cost of a repeater system. By reversing a portion of the signals to the interface and by providing first and second management circuits that are alternately controlled by modifiable control signals when in forward and reverse mode an improved media independent interface is provided.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A media independent interface (MII) circuit comprising:

a first management circuit operating in a first mode, the first mode being an interface between the MII and a media access control (MAC) device;

a second management circuit operating in a second mode, the second mode being an interface between the MII and a physical layer (PHY) device; and a plurality of signals being provided to and sent from the MII circuit, a first portion of the plurality of signals being operable with either the physical layer PHY device or the MAC device, a second portion of the plurality of the signals to be provided to and from the first management circuit and the second management circuit, the second portion of the plurality of signals being modifiable such that they are operable with the first management circuit and the second management circuit.

2. The circuit of claim 1 wherein the first mode comprises a forward mode.

3. The circuit of claim 2 wherein the second mode comprises a reverse mode.

4. The circuit of claim 1 wherein the first management circuit comprises a MAC management circuit.

5. The circuit of claim 4 wherein the second management circuit comprises a PHY management circuit.

6. The circuit of claim 1 wherein the first portion of the plurality of signals comprises transmitter, receiver and control signals.

7. The circuit of claim 6 wherein the second portion of the plurality of signals comprises management control signals.

8. A repeater system comprising:

at least one physical layer (PHY) device;

at least one media access control (MAC) device; and a repeater core coupled to the at least one MAC device and the at least one PHY device; the repeater core including media independent interface (MII) circuit which is alternately adaptable to interface with the at least one MAC device and the at least one PHY device; the MII circuit comprising:

a first management circuit operating in a first mode, the first mode being an interface between the MII and the MAC device;

a second management circuit operating in a second mode, the second mode being an interface between the MII and the PHY device: and a plurality of signals being provided to and sent from the MII circuit, a first portion of the plurality of signals being operable with either the PHY device or the MAC device, a second portion of the plurality of the signals to be provided to and from the first management circuit and the second management circuit, the second portion of the plurality of signals being modifiable such that they are operable with the first management circuit and the second management circuit.

9. The repeater system of claim 8 wherein the first mode comprises a forward mode.

10. The repeater system of claim 8 wherein the second mode comprises a reverse mode.

11. The repeater system of claim 8 wherein the first management circuit comprises a MAC management circuit.

12. The repeater system of claim 11 wherein the second management circuit comprises a PHY management circuit.

13. The repeater system of claim 8 wherein the first portion of the plurality of signals comprises transmitter, receiver and control signals.

14. The repeater system of claim 13 wherein the second portion of the plurality of signals comprises management control signals.

* * * * *